Figure 1:
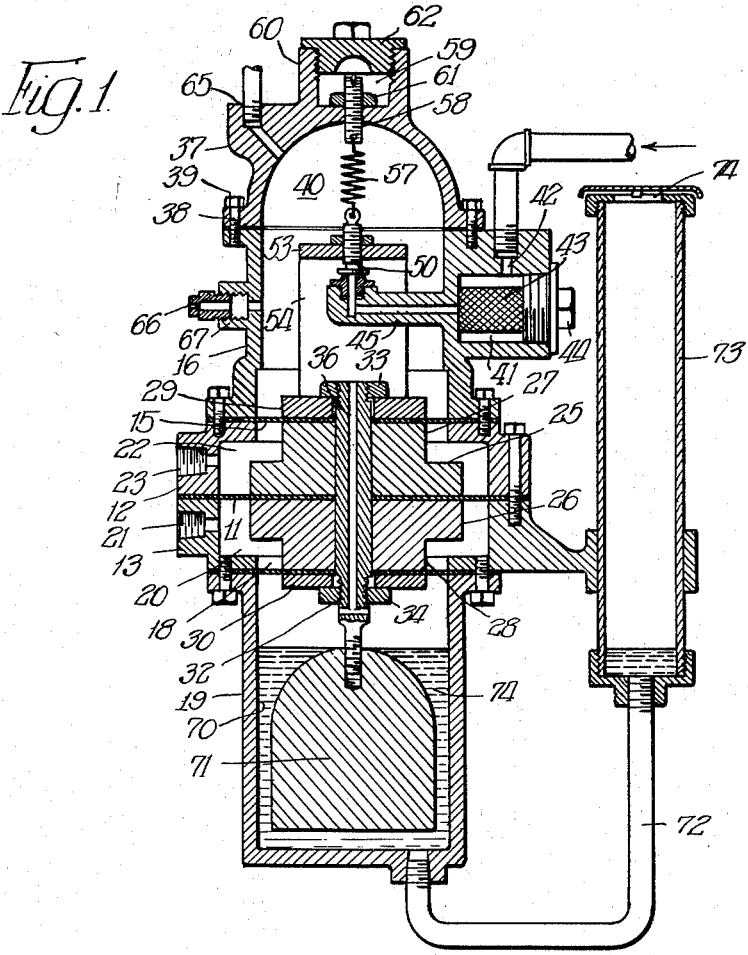

Aug. 29, 1950     W. J. HUGHES     2,520,547
LINEAR PNEUMATIC CONVERTER
Filed April 30, 1949

INVENTOR.
Walter J. Hughes,
BY
Agent

Patented Aug. 29, 1950

2,520,547

UNITED STATES PATENT OFFICE 2,520,547

LINEAR PNEUMATIC CONVERTER

Walter J. Hughes, Chicago, Ill., assignor to Infilco Incorporated, Chicago, Ill., a corporation of Delaware Application April 30, 1949, Serial No. 90,643

6 Claims. (Cl. 137—153)

1

This invention relates to pneumatic telemetering systems for measuring variable forces and transmitting a controlled pneumatic pressure to a remote point where it may be utilized for measurement or control. More particularly, this invention relates to an apparatus of this general type which is adapted to convert an applied pressure which varies as the square of a condition to be measured into a controlled pressure within a predetermined range which varies in linear relation to said condition.

It is an object of this invention to provide a linear controlled air pressure converter which is cheap in construction and simple in operation.

Another object of the invention is to provide a converter which is highly responsive and accurate over the entire range of flows to be measured.

Another object of the invention is to provide a converter which is devoid of gearing, cams and similar mechanisms which are difficult and expensive to make.

Another object of the invention is to provide a linear air pressure converter wherein a linear relationship between a flow to be measured and the controlled pressure delivered by the apparatus is obtained without employing friction creating means.

Another object of the invention is to provide a direct acting linear controlled air pressure converter which automatically extracts the square root of a flow head applied to it by nonfriction creating means included in the converter, and delivers a controlled air pressure varying directly as the flow.

These and other objects will become apparent from a consideration of the description and claims which follow.

The apparatus of my invention is particularly useful in converting flow heads or pressures into a controlled air pressure which varies directly with the flow. I will therefore describe the apparatus for purposes of exemplification and illustration in connection with the measuring of the rate of flow of a liquid; however, other applications will be apparent to those skilled in the art.

Briefly, the main elements of my apparatus include a diaphragm system on which the head or pressure of the flow to be measured is applied, an air pressure system which is operable by movement of the diaphragm system, and a counterbalancing and root extracting system which establishes a linear relation between the controlled air pressure delivered by the apparatus and the flow to be measured.

When the rate of flow of a liquid is to be meas-

2 ured, it is common practice to interpose a pressure differential creating device, such as a Venturi tube, or an orifice in the flow to be measured to create a pressure differential which is utilized as the basis for the measurement of the flow by applying it to some pressure differential responsive device. Since the pressures caused by fluid flow vary as the square of the flow, the values obtained from such pressure differential responsive devices also vary as the square of the flow. Various types of cams, gear systems and the like have been used to convert the head to square of flow or velocity relationship to a direct or linear relationship to flow. Such devices are expensive and difficult to make and, due to inherent friction, apparatus of this type are not as responsive to slight variations in flow as would be desirable. My new apparatus operates with great accuracy and sensitivity over its entire working range. It eliminates friction-creating square root extracting devices and utilizes instead simple means included in the converter itself, which convert heads varying as the square of flow values into pressure values varying directly with the flow values. When the pressure values obtained from my converter are measured on an indicating instrument, equal flow increments are shown at the instrument as equal increments on its dial over the entire range.

Figure 2:
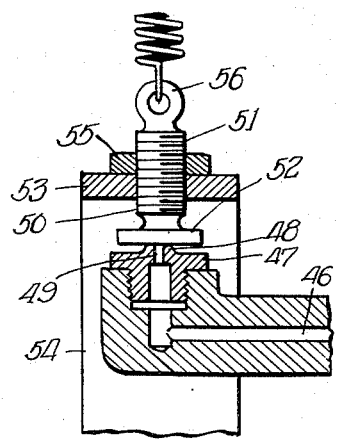

My invention will be more fully understood by reference to the drawing, which forms a part hereof, and wherein Figure 1 is a vertical sectional view of a preferred embodiment of my converter; and Figure 2 is an enlarged sectional view of the air inlet valve of the converter of Figure 1.

The converter of my invention is enclosed in a casing, generally indicated at 10, which may be formed of several sections. The midsections of the casing 10 house the diaphragm system. A diaphragm 11 is clamped between housing sections 12 and 13 by any suitable means, not shown. A diaphragm 15 is clamped between housing sections 12 and 16, and a diaphragm 18 between housing section 13 and a cylindrical section 19, as shown. The chamber 20 formed between diaphragms 11 and 18 has a port 21 which may be connected to a source of high pressure, not shown, such as the inlet end of a Venturi tube or the upstream side of an orifice. The chamber 22, formed between diaphragms 11 and 15 has a port 23 adapted to be connected to a source of low pressure, not shown, such as the throat of a Venturi tube or the downstream side of an orifice.

The diaphragms 11, 15 and 18 are preferably made of reinforced neoprene or the like; the reinforcement may be nylon fabric to obtain diaphragms of great flexibility and high sensitivity. Diaphragm 11 is provided with a pair of diaphragm plates 25 and 26 which may be integral with recessed spacers 27 and 28 abutting the diaphragms 15 and 18 respectively. Diaphragm keeper plates 29 and 30 are provided for the other sides of diaphragms 15 and 18 and are of the same diameter as the recessed spacers 27 and 28.

The diaphragm plates and spacers are locked together by a central bolt 32 as shown. The upper and lower ends of bolt 32 are threaded and lock nuts 33 and 34 are provided to hold the bolt 32 in place. The lowest end of the bolt 32 is shaped and threaded so that it can be screwed into a metal float 71 to be attached to bolt 32. The bolt 32 is cross drilled and center drilled as shown to provide an equalizing pressure tube 36 between the chambers above diaphragm 15 and below diaphragm 18, respectively.

The plates 25 and 26, the spacers 27 and 28 and the housing sections 12 and 13 are so proportioned with regard to each other as to provide a larger effective area for diaphragm 11 and equal smaller effective areas for diaphragms 15 and 18. Therefore, when the system is in operation (i. e. when the ports 21 and 22 are connected to a Venturi tube or the like, through which flow takes place) there will be an upward force acting on the diaphragm system which equals the difference in pressures prevailing in the high pressure chamber 20 and the low pressure chamber 22, multiplied by the effective area of the larger diaphragm 11 minus the pressure difference multiplied by the effective area of diaphragm 15 or 18. Expressed in a simpler way, the upward force will equal the pressure difference multiplied by the effective area of the diaphragm system. Only small annular diaphragm gaps are left between the several diaphragm plates or spacers and the respective housing sections; this is permissible, as the movement of the system is extremely small and may be as little as one or two thousandths of an inch.

The top of the casing 10 is closed by a cap 37 which is flanged to the housing section 16 and fastened by bolts 38 provided with nuts 39. Chamber 40 thus formed encloses the diaphragm 15 and is the upper or inlet air chamber of the system. A screen chamber 41 is formed on the side of the air chamber 40, as shown. Air under suitable pressure enters the screen chamber 41 through a port 42 and passes through the screen 43. A plug 44 is provided in screen chamber 41 so that the screen 43 can be removed for cleaning. A projection 45 extending into the air chamber 40 is drilled to form an air inlet conduit 46 to the center line of the air chamber 40, where it turns upwardly. An air supply valve 50 regulates flow of supply air through conduit 46 into chamber 40.

As best shown in Figure 2, an air supply valve seat 47 is screwed into the upturned end of the projection 45. The valve seat 47 has an upturned lip 48 in which an air inlet port 49 is formed. The valve member cooperating with the port 49 is formed by a screw 51 having a lower plate-shaped end 52 whose lower face is hardened, ground and polished to form an air tight contact with the lip 48 of the port 49 with which the valve plate 52 is lapped. The threaded shank of the valve screw 51 is carried for adjustment in a threaded cross member 53 of a U-shaped fork 54. A lock nut 55 is provided to hold the screw in the desired position. The lower ends of the U-fork 54 are attached to the diaphragm keeper plate 29 and move with the diaphragm assembly whereby the admission of the air to air chamber 40 through the air inlet port 49 is controlled by the movements of the diaphragm system.

The upper end of the valve screw 51 has an eye 56 into which is hooked the lower loop of a balancing spring 57. The upper loop of spring 57 is hooked into an eye in the lower end of an adjustment screw 58. The screw 58 extends through the cover 37 into an adjustment chamber 59 formed on top of the cap 37 by a hollow boss 60 and closed by a plug 62. A nut 61 is provided for holding the screw 58 in adjustment. A controlled air pressure port 65 is provided in a wall of the air chamber 40, as, for example, in the cap 37. The port 65 may be connected to any instrument, not shown, which utilizes the controlled linear air pressure derived from the converter. The air chamber 40 is also provided with a small constantly open escapement orifice 66 which may be screwed into a boss 67 on the housing section 16, as shown.

The cylindrical section 19 of housing 10 forms a manometer chamber 70 which is filled to a predetermined level with a suitable manometric liquid, such as, for instance, mercury. The other leg, 73, of the manometer is connected to chamber 70 by a line 72 leading from the bottom of the chamber 70 to the bottom of cylinder 73. Cylinder 73 is open to atmosphere through protected openings 74 adjacent its top. The shaped float 71 is housed in chamber 70.

When the ports 21 and 23 are connected to a Venturi tube or other pressure differential creating device in a liquid flow conduit, liquid fills the chambers 20 and 22. The effective weight acting downwardly upon the diaphragm system when there is no flow through the liquid flow conduit, which includes the weight of the liquid in chambers 20 and 22, the weight of the diaphragm plates, spacers and movable parts of the air valve connected to the diaphragm system and the weight of the float attached to it, is made as nearly as possible equal to the upward thrust of the float 71 when the float is submerged in manometric liquid 75. Sufficient manometric liquid will be provided to maintain the mercury level at an elevation to submerge the float 71 when the diaphragm system is in the neutral position. Slight discrepancies between the downward weight force acting on the diaphragm system and the opposed upward force due to the buoyancy of the float in the manometric liquid can be adjusted by proper setting of the balancing spring 57. When the system is in proper neutral adjustment with the mercury level at the proper elevation, the air inlet valve 50 is closed. At this zero, or no-flow, condition, where the air inlet valve is closed, atmospheric pressure will prevail in the air chamber 40 due to its connection to atmosphere through escapement port 66, and will also prevail in the lower or manometer chamber 70 due to the equalization of pressures in the two chambers through tube 36. Since the cylinder 73 is also open to atmosphere through openings 74, the liquid levels in the two legs 70 and 73 of the U tube will be at the same elevation as long as the system is in the neutral position.

To provide for a linear relation between the flow to be measured and the controlled air pressure delivered by the converter, the float 71 is shaped in a manner, that when the manometric liquid is depressed by air pressure due to the upward force of the flow pressure differential applied to the diaphragm system, the decrease in the buoyancy effect of the float is proportional to the square root of the weight of the displaced volume of manometric liquid. Therefore, the controlled air pressure which will restore balance to the system is also proportional to the square root of such weight and thus a linear relation exists between the flow to be measured and the controlled air pressure.

The operation of my converter as flow through the flow conduit ensues, will be readily understood.

Assuming, for example, that the range of controlled air pressure is to be from 0 to 3 p. s. i. (pounds per square inch) for a range of flow of from 0 to 150 per cent, then the linear relation between flow and controlled air pressure is as follows:

| Flow | Controlled Air Pressure |
|---|---|
| Percent | P. s. i. |
| 0 | 0 |
| 50 | 1 |
| 100 | 2 |
| 150 | 3 |

In this case a suitable supply pressure for the air system would be somewhat in excess of the rated maximum 3 p. s. i. air pressure, say 5 p. s. i.

With the converter balanced as explained above, assuming the flow rate rises to 50 per cent of normal, and the flow head or differential applied to the diaphragm system is 1 pressure unit, then the upward force acting on the diaphragm system whose area is A reaches a value of $1 \times A$. Immediately, the diaphragm system will rise slightly in response to the pressure. The U-shaped fork 54 which is attached to diaphragm plate 29 will rise with the diaphragm system and will lift the valve plate 52 off the valve port 49, whereby air under operating pressure is admitted to the air chamber 40 and air pressure builds up in the air chamber, escapement port 66 being too small to permit escape of more than an inconsiderable quantity of air. This air pressure is immediately transmitted to the surface of the manometric liquid in chamber 70 through equalizing tube 36 and will depress the liquid in chamber 70, the displaced liquid rising in cylinder 73. As the liquid level in chamber 70 falls, a portion of the shaped float will no longer be submerged. The upward force due to the buoyancy of the float 71 is accordingly decreased and to this extent the downward weight force acting on the diaphragm system is no longer balanced by the buoyancy of the float. Air pressure will continue to build up in air chambers 40 and 70 until sufficient manometric liquid is displaced that the unbalanced weight force on the diaphragm system equals the upward force due to the applied flow head. When these two forces reach equilibrium, the controlled air pressure in the air chamber 40 and float chamber 70 must be at the value of 1 pressure unit, as only this air pressure will displace sufficient manometric liquid to reduce the buoyancy effect of the float by a value equal to the upward thrust of 1 pressure unit on the diaphragm system. Regulation of these forces takes place automatically by the response in regulation of admission of air at the air inlet valve 50.

It will be understood that if the air pressure reaches a value where more weight of the diaphragm system is unbalanced by depression of manometric fluid than is required to balance the upthrust of the diaphragm system for a given flow head, the air pressure will at once be reduced by closing of the air supply valve 50. Similarly, if insufficient air pressure acts to depress the mercury and subtract the proper amount of buoyancy effect of the float, the upthrust of the diaphragm system for a given flow head will not be completely balanced and the air valve will be opened to increase the air pressure accordingly.

The balance brought about by this converter may be tabulated as follows:

| Flow in Per Cent of Normal | Upthrust of Diaphragm System due to the Venturi Head | Decrease in Buoyancy Effect of the Shaped Float by Hg Displacement due to Controlled Air Pressure | Air Pressure Necessary to Displace the Required Volume of Hg |
|---|---|---|---|
| 0 | $0 \times A$ | $0 \times A$ | 0 |
| 50 | $1 \times A$ | $1 \times A$ | 1 |
| 100 | $4 \times A$ | $4 \times A$ | 2 |
| 150 | $9 \times A$ | $9 \times A$ | 3 |

A in the above table is the effective differential area of the diaphragm system upon which the relative flow heads of 0, 1, 4 and 9 head units act, the head units varying as the square of the flow. The air pressure, being applied to the upper and lower diaphragms which are of equal area, has no effect upon the diaphragm system, but it does act to depress the mercury in the chamber 70 and thereby unbalances a part of the downward weight force acting on the diaphragm system by decreasing the buoyancy effect of the shaped float. By shaping the float as described the air pressure is brought into linear relation with the flow to be measured. Thus the converter gives a linear controlled air pressure which may be conveyed through the controlled air pressure port 65 to any pressure responsive instrument suitable for indicating, recording or otherwise utilizing the pressure in terms directly referring to flow units. Further, the flow units may be indicated or recorded or otherwise utilized in a manner to take advantage of the fact that when charted, the relation of air pressures to flow units becomes a straight line passing through the zero point. In other words, no fictitious values occur to introduce non-linear readings at and near the zero point with the result that greater accuracy and readability is attained over the full working range of the converter and its associated instruments.

I claim:

1. Apparatus for delivering a controlled pressure directly proportional to a condition comprising an air chamber, an inlet for air under pressure to said air chamber, a valve on said inlet, a controlled air pressure port in said air chamber, an escapement port in said air chamber, pressure sensitive means, means for applying a pressure to said pressure sensitive means which varies as the square of said condition, a connection between said pressure sensitive means and said valve whereby said valve is positioned by movement of said pressure sensitive means in response to the applied pressure, a shaped float attached to said pressure sensitive means, a manometer, said float depending into one leg of said manometer and adapted to be submerged in manometric liquid in said leg at the zero position of said pressure sensitive means, and conduit means connecting said air chamber to said one leg of of said manometer, said float being shaped in accordance with the functional relation between the force applied to said pressure sensitive means and said condition.

2. A linear controlled air pressure converter comprising a housing, a diaphragm in said housing, means for applying a force to said diaphragm which varies as the square of a condition, an air chamber in said housing above said diaphragm, a compressed air inlet into said air chamber, a valve controlling flow of air through said inlet, means for positioning said valve by movements of said diaphragm, a controlled air pressure port in said air chamber adapted to be connected to an instrument, a constantly open escapement orifice in said air chamber, a manometer chamber in said housing below said diaphragm, a shaped float depending from said diaphragm into said manometer chamber and submerged in manometric liquid in said chamber at the zero position of said diaphragm, and a pressure equalizing tube connecting said air chamber and said float chamber, said float being shaped in accordance with the functional relation between the force applied to said diaphragm and said condition.

3. Apparatus for converting the rate of flow of a liquid into a controlled air pressure directly proportional to the rate of flow, comprising a housing, three diaphragms in said housing and forming therein a high pressure chamber and a low pressure chamber, an air chamber above said low pressure chamber and a manometer chamber below said high pressure chamber, said diaphragms being connected in such manner as to move in unison, means for connecting said high pressure chamber to a point of high pressure in said liquid flow, means for connecting said low pressure chamber to a point of low pressure in said liquid flow, pressure equalizing means between said air chamber and said manometer chamber, an air inlet into said air chamber, a valve on said inlet, means for positioning said valve by movement of said diaphragms, a controlled air pressure port from said air chamber, an escapement port from said air chamber, a shaped float in said manometer chamber and attached to the lowermost diaphragm, said float at the zero position of said diaphragms being submerged in manometric liquid in said manometer chamber, the buoyancy of said float when thus submerged balancing the weight of the diaphragm system and parts supported thereby, and of the liquid in said high and low pressure chambers, and said float being shaped in such manner that the decrease of its buoyancy effect due to depression of manometric liquid by air pressure from said air chamber will be proportional to the square root of the weight of the displaced manometric liquid.

4. A converter of the type described comprising a housing, a differential diaphragm system in said housing, including two sealing diaphragms of equal effective areas and an intermediate operating diaphragm of larger effective area, the chambers enclosed by said diaphragms being adapted to be connected to a source of high pressure and a source of low pressure respectively, an air chamber in said housing separated from said low pressure chamber by one of said sealing diaphragms, a compressed air inlet into said air chamber, a valve on said inlet, means for positioning said valve by movement of said diaphragm system, a controlled air pressure port in said air chamber adapted to be connected to an instrument, an escapement port from said air chamber, a manometer chamber in said housing separated from said high pressure chamber by the other of said sealing diaphragms, means adapted to equalize the pressure in said air chamber and said manometer chamber, a shaped float in said manometer chamber, the surface of manometric liquid in said manometer chamber at zero condition being at an elevation to submerge said float, the upward force due to buoyancy of said float at zero condition balancing the downward force due to weight acting on said diaphragm system, said float being shaped in such manner that when the manometric liquid is depressed by air pressure in said air chamber, its buoyancy is decreased by amounts proportional to the square root of the weight of displaced manometric liquid.

5. In a direct-acting linear converter of the type described, a diaphragm system connected to respond to heads derived from fluid velocities, a chamber enclosing one end of said diaphragm system, an inlet for air under pressure into said chamber, a valve on said inlet regulated by said diaphragm system for controlling the pressure of the air in the said chamber, an escapement port and take off connecting means in the wall of said chamber, a second chamber enclosing the other end of said diaphragm system, said second chamber being cylindrical in shape and forming one leg of a manometer, the other cylindrical leg of which is open to atmosphere, a connection from said first chamber to said second chamber for equalizing the air pressure in said chambers, a quantity of manometric fluid in the said manometer, and a shaped float connected to the said diaphragm system and submerged in said manometric fluid within said second chamber, whereby weight means are derived from the shaped float for loading said diaphragm system to a balance when the controlled air pressure displacing manometric fluid in said manometer reaches a value proportional to the value of the fluid velocity from which the head applied to said diaphragm system is derived.

6. Apparatus for delivering a controlled pressure directly proportional to a condition, comprising pressure sensitive means, means for applying a pressure to said pressure sensitive means which varies as the square of said condition, a manometer, a shaped float attached to said pressure sensitive means and depending into one leg of said manometer, means for applying a controlled air pressure to manometric liquid in said manometer, said means including an air inlet valve positioned by movement of said pressure sensitive means, said float being adapted to be submerged in the manometric liquid in said leg at the zero position of said pressure sensitive means and being shaped in such manner that the decrease of its buoyancy effect due to depression of said manometric liquid by said air pressure is proportional to the square root of the weight of the displaced manometric liquid, and a controlled air pressure port adapted to be connected to an instrument.

WALTER J. HUGHES.

REFERENCES CITED

The following references are of record in the file of this patent:

UNITED STATES PATENTS

| Number | Name | Date |
| --- | --- | --- |
| 1,638,102 | Roucka | Aug. 9, 1927 |
| 1,992,343 | Ahnstrom | Feb. 26, 1935 |
| 2,013,810 | Shimek | Sept. 10, 1935 |
| 2,146,176 | Donaldson | Feb. 7, 1939 |